US012583316B2

(12) United States Patent
Iliffe-Moon

(10) Patent No.: US 12,583,316 B2
(45) Date of Patent: Mar. 24, 2026

(54) USER INTERFACE FOR A VEHICLE AND A VEHICLE

(71) Applicant: Bayerische Motoren Werke Aktiengesellschaft, Munich (DE)

(72) Inventor: Etienne Iliffe-Moon, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 283 days.

(21) Appl. No.: 18/186,851

(22) Filed: Mar. 20, 2023

(65) Prior Publication Data

US 2023/0322082 A1 Oct. 12, 2023

(51) Int. Cl.
  *B60K 35/00* (2024.01)
  *B60K 35/10* (2024.01)
  *B60K 35/21* (2024.01)

(52) U.S. Cl.
  CPC .............. *B60K 35/00* (2013.01); *B60K 35/10* (2024.01); *B60K 35/211* (2024.01); *B60K 2360/126* (2024.01); *B60K 2360/143* (2024.01); *B60K 2360/1438* (2024.01)

(58) Field of Classification Search
  CPC ................................ B60K 35/10; G02B 23/26
  See application file for complete search history.

(56) References Cited

U.S. PATENT DOCUMENTS

2012/0287663 A1 * 11/2012 Lathrop ................. B60K 35/10
                                                          362/558
2017/0182890 A1    6/2017 Ruemelin et al.
2018/0373350 A1 * 12/2018 Rao ......................... G06F 3/038
2022/0229500 A1 *  7/2022 Fong ..................... G06F 3/0362

FOREIGN PATENT DOCUMENTS

CN        109901719 A      6/2019
DE     102008040755 A1     2/2010
DE     102019122630 A1     2/2021

OTHER PUBLICATIONS

German Office Action corresponding to German Patent Application No. 10 2022 107 164.2, dated Nov. 8, 2024 (6 pages).
English Translation of CN109901719A. (5 Pages).

* cited by examiner

*Primary Examiner* — Nan-Ying Yang
(74) *Attorney, Agent, or Firm* — Maginot, Moore & Beck LLP

(57) ABSTRACT

A user interface for a vehicle is adapted to present visible information capture user input. The user interface includes an optical faceplate having a flat contact surface, a three-dimensional display surface, and an optic light guide material provided between the contact surface and the three-dimensional display surface. A two-dimensional display and the contact surface are arrangeable so that light emitted from the display is receivable by the contact surface. The faceplate is movably arrangeable at the two-dimensional display, and the user interface senses a motion of the faceplate on the two-dimensional display as user input. The user interface is adapted to sense a rotational motion of the faceplate and a translational relative motion between the faceplate and the two-dimensional display The rotational motion is defined by a rotation of the faceplate around a rotational axis being arranged perpendicular to the contact surface and/or the two-dimensional display.

17 Claims, 2 Drawing Sheets

USER INTERFACE FOR A VEHICLE AND A VEHICLE

This application claims priority to German Patent Application No. 102020107164.2 filed on Mar. 25, 2022, the disclosure of which is incorporated in its entirety by reference herein.

TECHNICAL FIELD

The present disclosure relates to a user interface for a vehicle.

BACKGROUND

A known user interface can comprise a two-dimensional flat display to display information and/or a physical button or knob to capture user input and to provide a physical affordance for the user.

Two-dimensional displays are used to present a variety of information to the driver and/or other passengers of the vehicle. Two-dimensional displays can comprise a touch functionality to capture user input. Thereby, the two-dimensional display with touch functionality, also called touchscreen, can provide a part of the user interface with a large number of functions. During driving it appears to be difficult to make use of the large number of functions, in particular for the driver who needs to pay attention to driving the vehicle. Furthermore, due to a lack of feedback perceivable by a user, e.g., the driver, in case of a touch sensitive display it appears difficult for the user to perform an accurate input, e.g., with a user's finger. For the same reason, the driver is distracted and needs to pay visual and cognitive attention to operate a touch sensitive display. That is, such a two-dimensional display comprises a plurality of aspects that needs to be improved.

Physical buttons provide a physical affordance which provides important benefits, in particular when used in a vehicle. E.g., user-friendliness by providing physical stability to a finger interacting with the button, reduced distraction as opposed to using a touchscreen, and familiarity as the button's physical location and function is substantial and consistent. The physical button allows a blind operation since the user memorizes and/or feels where to find the button, how to operate it and/or which function it has. Thus, compared to a touch sensitive display, a physical button enables a favorable tactile perception. In addition, a physical button may also be an aesthetic feature of the vehicle. However, physical buttons have properties that may be disadvantageous, such as having a dedicated function and a lack of relationship to the digital user interface, e.g., to content that is displayed on a two-dimensional display.

A digital touchscreen and a graphical user interface, GUI, is digital or virtual rather than physical in the way an "analog" device is, e.g., the volume knob or slider on an old hi-fi or stereo system, the temperature dial on a thermostat or heater, etc. Analog interfaces have the benefit of being very easy to understand and are considered to be intuitive US 2020/0079216 A1 discloses an operating apparatus that comprises a touchscreen and an operating knob in the region of the touchscreen, wherein the knob comprises a sidewall with a plurality of luminous outputs of at least one luminous segment or a pixel matrix, and wherein the knob is provided in the panel of the touchscreen. In this embodiment, the knob is not movable as being integrated in the touchscreen. This allows sensing a rotary movement, a sliding movement and/or a push movement of a finger on the surface of the operating knob while the operating knob remains unmoved. Alternatively, the knob is movably integrated as a separate component in the touchscreen by way of a rod or an axle. This allows a relative movement of the knob in relation to the touchscreen, in particular a lever movement and/or a tilting movement. Therein, the operating apparatus comprises a curved pixel matrix provided in the knob.

However, such a curved pixel matrix is costly and an electrical connection thereto is complex due to the movability. Furthermore, the motion of the knob is constraint by the rod or axle.

It is therefore desirable to provide an improved user interface that combines the benefits of an analog user interface and of a digital interface and in particular enables improved methods of input.

SUMMARY

At least some of the embodiments described herein provide an improved user interface with the above-stated benefits, as well as others.

According to an embodiment, a user interface for a vehicle is adapted to present visible information and adapted to capture user input; the user interface comprises an optical faceplate comprising a flat contact surface, a three-dimensional display surface for displaying information, and an optic light guide material provided between the contact surface and the three-dimensional display surface; wherein a two-dimensional display and the contact surface are arrangeable so that light emitted from the display for displaying information is receivable by the contact surface; wherein the faceplate is movably arrangeable at the two-dimensional display; and the user interface is adapted to sense a motion of the faceplate on the two-dimensional display as user input, wherein the user interface is adapted to sense a rotational motion of the faceplate and a translational relative motion between the faceplate and the two-dimensional display, wherein the rotational motion is defined by a rotation of the faceplate around a rotational axis being arranged perpendicular to the contact surface and/or the two-dimensional display.

At least one embodiment combines the three-dimensional faceplate, which may provide a contextual sensitive digital and physical affordance, with the two-dimensional display on which the faceplate is movably arrangeable. This improves ease of use and safety of user input by providing physical affordances to touch and hold on the two-dimension screen. The faceplate applied to the two-dimensional display enables a user interface enabling a user to physically touch, hold and articulate the faceplate, and adds additional stability and ease-of-use when manipulating the faceplate to perform user input. Therein, the expression to articulate the faceplate means to move the faceplate. The ability to physically articulate the faceplate provides an additional dimension to user input to the user interface via the faceplate, i.e., a richer and more expressive user interface.

The user interface is adapted to sense a motion of the faceplate. The motion of the faceplate comprises a rotational motion and a translational motion. The translational motion is a linear motion locally parallel to the two-dimensional display, locally perpendicular to the two-dimensional display, and/or a linear combination thereof. Therein, the expression locally refers to a two-dimensional display that might be bend and/or curved and thus comprises a varying normal direction on the surface of the two-dimensional display. The user interface is adapted to sense the motion of the faceplate, i.e., the rotation around the rotational axis and the translation of the faceplate relative to the two-dimensional display. This enhances the variability of input in an intuitive manner.

Thus, the functionality of buttons is moved to the digital user interface, such as a user interface for a CID or a panorama display (pillar-to-pillar, p2p), steering wheel controller (MFL), a panorama head-up display (PHUD), and/or a personal information display (PID) without increasing the complexity of the user interface. Thus, the invention simplifies the user interface without deteriorating the functionality of the user interface.

Optionally, the user interface is adapted to sense the presence and/or absence of the faceplate on the two-dimensional display. The motion of the faceplate relative to the two-dimensional display comprises a removal of the faceplate from the two-dimensional display and/or a positioning of the faceplate on the two-dimensional display. This embodiment enables an additional mode of input and/or output. The user interface is adapted sense positioning the faceplate onto the two-dimensional display and/or removal of the faceplate from the two-dimensional display.

Optionally, an areal extension of the three-dimensional display surface and/or an areal extension of the contact surface is smaller than an areal extension of the two-dimensional display, wherein the two-dimensional display comprises a plurality of sensing sections, wherein the user interface is adapted to sense the motion of the faceplate at the sensing sections. This embodiment is particularly effective in sensing the motion of the faceplate in a localized manner. The sensing sections are arranged and/or distributed on the two-dimensional display and are separated from each other. The translational motion of the faceplate comprises a motion of the faceplate from a first sensing section to a second sensing section. At one or more of the sensing sections, the rotational motion of the faceplate is sensable.

Optionally, the user interface comprises a plurality of two-dimensional displays, wherein each two of the two-dimensional displays are separated from each other. In this embodiment, the motion of the faceplate is sensable at one of the two-dimensional displays.

Optionally, the user interface is adapted to distinguish the motion of the faceplate on a first two-dimensional display from a motion of the faceplate on a second two-dimensional display from each other. This embodiment enables a distinguished sensing of motion of the faceplate, wherein the motion of the faceplate is distinguished by the two-dimensional display on which the motion of the faceplate is sensed.

Optionally, the user interface is adapted to derive a user input in dependence on the two-dimensional display on which the motion of the faceplate is sensed. This embodiment enables an additional mode of user input as the motion of the faceplate on the first two-dimensional display optionally leads to another input as the motion of the faceplate on the second two-dimensional display.

Optionally, the user interface is adapted to display information in dependence on the motion of the faceplate. This embodiment enables a direct response of the user interface to the motion of the faceplate.

Optionally, the three-dimensional display surface is touch sensitive. The faceplate may be touch sensitive, e.g., by capacitive touch sensing, allowing multi-touch user input and gestures. This embodiment enables an additional mode of user input. For example, a combined user input is derivable from the articulation of the faceplate and direct interaction on faceplate, e.g., when the faceplate is rotated to a static position the GUI that appears on the faceplate changes functionality according to the orientation of the faceplate and the user can touch interact with the content being displayed on two-dimensional display.

Optionally, the user interface is adapted to derive a combined user input from input to the three-dimensional display surface and/or the two-dimensional display and from the motion of the faceplate. This embodiment enables an additional mode of user input.

According to an embodiment, a vehicle comprises the user interface discussed above. Optionally, the user interface of the vehicle comprises one or more of the above-described optional features to achieve a technical effect associated therewith.

The above-described features and advantages, as well as others, will become more readily apparent to those of ordinary skill in the art by reference to the following detailed description and accompanying drawings.

Features and combinations of features as describes above and features and combinations of features as disclosed in the figures and described with relation to the figures can be used as such or combined without leaving the scope of the invention.

DETAILED DESCRIPTION

In the figures, the same and functionally similar elements are used with the same reference signs.

Figure 1:
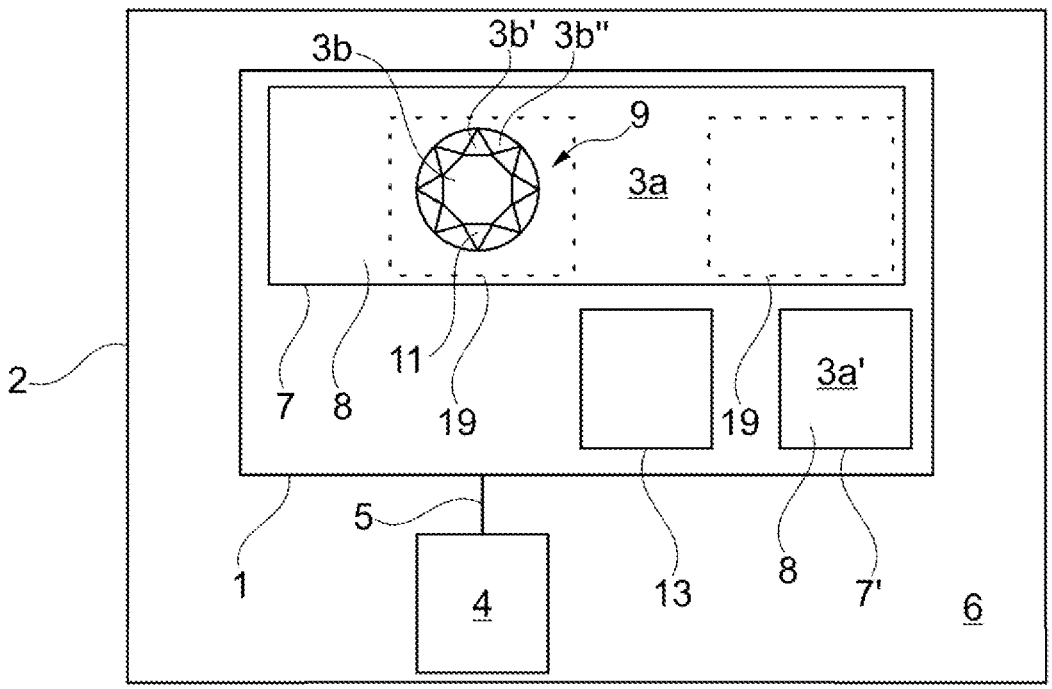
FIG. 1 shows a schematic representation of a user interface comprised by a vehicle according to an embodiment of the invention.

FIG. 1 shows a schematic representation of a user interface 1 comprised by a vehicle 2. The user interface 1 is adapted to present visible information 3a, 3a', 3b, 3b', 3b" to a user 4 and adapted to capture user input 5 by a user 4. The user 4 can be a driver of the vehicle 2 and/or a passenger of the vehicle 2. The user 4 can also be a passenger of an autonomously driving vehicle 2. The user interface 1 may be arranged at any surface in the front or rear of the vehicle 1, for any user; e.g., at a steering wheel, dashboard, center console, center armrest, door panel.

The user interface 1 is arranged in a cabin 6 of the vehicle 2 so that the user 4 can perceive visible information 3a, 3a', 3b, 3b', 3b" output by the user interface 1.

The user interface 1 comprises two two-dimensional displays 7, 7' being separated from each other and also called a display panel, for displaying information 3a, 3a' on a display portion 8. In another embodiment (see FIGS. 3 and 4), the user interface 1 comprises one two-dimensional display 7. The display portion 8 is a section of each of the two-dimensional displays 7, 7' on which information 3a is displayed in a two-dimensional and visibly perceivable manner. However, information 3a that is displayed can also be rendered to appear three-dimensional, e.g., one or both of the displays 7, 7' may be a display that simulates 3D, e.g., a stereographic or autostereographic display. The two-dimensional display 7, 7' comprises a pixel arrangement, e.g., a pixel matrix with a two-dimensional array of colored pixels that can be illuminated individually. The two-dimensional display 7, 7' does not necessarily refer to a geometric shape of the display, e.g., the display may be curved, bent and/or flexible. Each of the two-dimensional displays 7, 7', e.g., CID or panorama display, can be curved or bent about one or more axes, optionally to have a shape that follows a section of the cabin 6 of the vehicle 2. Each of the two-dimensional displays 7, 7' is an active matrix, e.g., an MicroLED, OLED, LCD, MicroDisplay, rigid or flexible.

Figure 2:
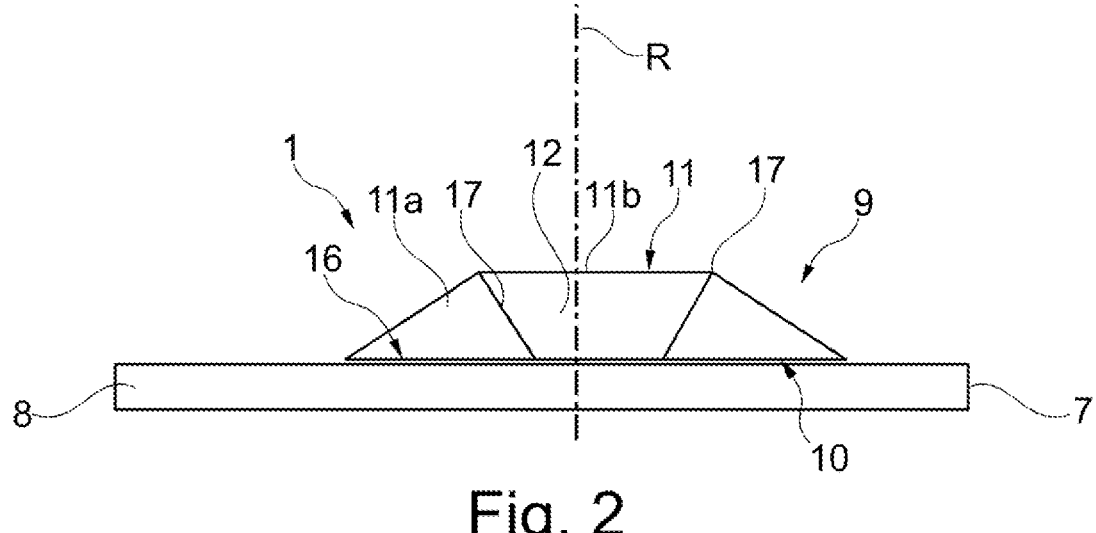
FIG. 2 shows a section of a schematic side view of the user interface shown in FIG. 1.

The user interface 1 comprises an optical faceplate 9 comprising a contact surface 10, a three-dimensional display surface 11 for displaying information 3b, 3b', 3b'', and an optic light guide material 12 provided between the contact surface 10 and the three-dimensional display surface 11, see also FIG. 2. The faceplate 9 is arrangeable and in the shown schematic arranged at a front of the first display 7. The faceplate 9 is arrangeable at the second display 7'. The faceplate 9 comprises an areal extension of the three-dimensional display surface 11 and/or an areal extension of the contact surface 10 which is smaller than an areal extension of the display 7. The faceplate 9 is arrangeable on each of the two-dimensional displays 7, 7' so that the contact surface 10 is arranged to receive light emitted from the respective display 7, 7'. The faceplate 9 covers a partial area of the display 7, 7' on which the faceplate 9 is arranged. The faceplate 9 and its arrangement are also shown in FIG. 2 and further explained with reference thereto.

In FIG. 1, the user interface 1 comprises the two-dimensional displays 7, 7' and the optical faceplate 9 to output the visibly perceivable information 3a, 3a', 3b, 3b', 3b''. The faceplate 9 is a localized touchpoint/affordance with specific user interface content and enables user interactions. In one embodiment, the faceplate 9 is substantially smaller than the displays 7, 7', e.g., the larger display 7 has a diagonal of 10 inches to 50 inches and the faceplate 9 has a diagonal, diameter and/or characteristic length of 1 inch to 4 inches.

The faceplate 9 is movably arranged on the two-dimensional display 7. The faceplate 9 may be free to be moved, removed and placed on the two-dimensional display 7.

The user interface 1 is adapted to sense a motion of the faceplate 9 on the two-dimensional display 7 as user input 5. The user interface 1 is adapted to sense a rotational motion of the faceplate 9 and a translational relative motion between the faceplate 9 and the two-dimensional display 7. The rotational motion is defined by a rotation of the faceplate 9 around a rotational axis R being arranged perpendicular to the contact surface 10 and/or the two-dimensional display 7 (see FIGS. 2 and 4). Optionally, the two-dimensional display 7 is formed in such a way to allow the faceplate 9 to move within that form or shape of the display. Optionally or additionally the articulation may include a removal and positioning of the faceplate 9 on one of the two-dimensional displays 7, 7' (see also FIG. 9 (C)).

The two-dimensional display 7 comprises a plurality of sensing sections 19 as indicated by the rectangles with dotted lines. The user interface 1 is adapted to sense the motion of the faceplate 9 at the sensing sections 19. I.e., the motion of the faceplate 9 being arranged at the two-dimensional display 7 within the sensing sections 19 is sensable. The user interface 1 is adapted to derive a user input 5 in dependence on the two-dimensional display 7 on which the motion of the faceplate 9 is sensed.

Optionally, the faceplate 9 may be located by magnets acting through the two-dimensional display 7, 7', in particular within the sensing sections 19. This enables the faceplate 9 to be removable and replaceable in any location and/or preset locations. The faceplate 9 may be constrained or locked by a magnetic, electromagnet, mechanical or electromechanical arrangement, e.g., to prevent or constrain motion and/or articulation, to limit freedom of rotation, to increase friction, or to provide incremental or graduated motion. In this embodiment, the faceplate 9 optionally comprises a material that enables a magnetic and/or electromagnetic interaction with a magnet and/or with an electromagnet. In particular, the user interface 1, e.g., the display 7, 7', optionally comprises a dedicated docking section at which the faceplate 9 is arrangeable and fixable by an attractive force. This allows customization of the position of one or more faceplates 9 for different users, e.g., suited to the reach of a driver and/or a passenger. Thus, the magnets and/or an electromagnetically attractive element defines a position for the faceplate 9. Optionally, the arrangement of the faceplate 9 at one or more docking sections is customizable according to a state or feature of the GUI, e.g., a specific app running on the GUI, according to the journey such as start of drive and/or during drive, and/or gaming. Optionally, the configuration of the one or more magnet determines if the faceplate 9 is to be articulated or is in a static position and/or orientation. Additionally, magnets, electromagnets, and/or a combination of electro-mechanics can be used to dynamically control if the faceplate 9 is locked or free to articulate and/or to move. The magnets and/or electromagnets are arrangeable behind the display 7, 7' and a hole or an aperture through the display 7, 7' can be dispended with. Physical resistance or haptic effects may be provided by magnetics, electromagnets and/or a haptic actuator. The display 7 and the faceplate 9 are touch sensitive, e.g., by providing capacitive, resistive, ultra-sonic-based and/or camera-based touch sensitivity, to capture user input 5. The user input 5 can be captured by the touch sensitive display 7 being performed on the two-dimensional display 7 and relative to the faceplate 9 as user interaction. The user input 5 relative to the faceplate 9 can be captured by the three-dimensional display surface 9 which is touch sensitive.

The user input 5, i.e., the touch user input and the user interaction, are transmitted to a data processing device 13 that is comprised by the user interface 1. For receiving the user input 5, the data processing device 13 comprises one or more interfaces to receive, and/or one or more data storages to store, data that represents user input 5 captured by the display 7 and/or relative to the faceplate 9. The data processing device 13 is adapted to derive combined user input 5. Based on the combined user input 5, the user interface 1 is adapted to determine a control signal which contains control data to display information 3a, 3a', 3b, 3b', 3b'' on the display portion 8 and/or on the faceplate 9.

The user interface 1 can comprise multisensory feedback such as visual feedback as displayed on the two-dimensional display 7, the faceplate 9, other OLED/LCD displays, ambient lighting or projection, mechanical actuation and/or further tactile feedback, audio feedback such as sound effects or music, and/or olfactory feedback (not shown). The user interface 1 provides multimodal interactions, i.e., haptics and the visually perceivable display of information 3a, 3a', 3b, 3b', 3b'' are combined and can further be improved by the application of, e.g., an augmented reality or virtual reality head mounted display. In particular, the faceplate 9 is adapted to deliver haptic feedback during motion and/or articulation. Haptics is providable via the display 7 when the faceplate 9 is articulated by the user 4 during or simultaneously as the faceplate 9 is touched and moved by the user 4.

FIG. 2 shows a section of a schematic side view of the user interface 1 shown in FIG. 1. FIG. 2 is described with regard to details of the user interface 1 of FIG. 1.

The two-dimensional display 7 comprises a contact portion 18 that contacts the contact surface 10 of the faceplate 9 to transmit light that is emitted by the two-dimensional display 7 at the contact portion 18 via the contact surface 10 and the light guide material 12 to the three-dimensional display surface 11 where the transmitted light contains the information 3b, 3b', 3b" that is visible on the three-dimensional display surface 11.

The three-dimensional display surface 11 comprises a plurality of surface portions 11a, 11b that are separated from each other by an edge 17. The faceplate 9 can be shaped to provide a three-dimensional surface that the user may touch. For example, the three-dimensional display surface 11 may be faceted, e.g., like a jewel, as schematically shown in FIGS. 1 and 2 or have segmented or continuous concave, convex, and/or organic surface portions, and/or may have a symmetric or asymmetric, round or rectangular shape (not shown). The surface portions 11a, 11b can also be separated differently than by edges 17, e.g., the surface portions 11a, 11b can appear to flow continuously into each other. Also, a combination thereof and edges 17 is possible. In another non-shown embodiment, an edge or a section of the three-dimensional display surface 11 may be virtually simulated or enhanced by the graphical treatment of the GUI, e.g., digitally change the color/material/finish, material/surface rendering and/or lighting can change the appearance of the faceplate 9.

As shown in FIG. 2, the plurality of edges 17 segments the three-dimensional display surface 11 in a plurality of surface portions 11a, 11b. The user interface 1 is adapted to display information 3b, 3b', 3b" so that the information 3b',3b" that is visible on the plurality of surface portions 11a, 11b can be dependent on or independent of each other. The user interface 1 is adapted to separately determine the information 3b', 3b" that is visible on the plurality of surface portions 11a, 11b. I.e., each segment of the three-dimensional display surface 11 of faceplate 9 can display different information 3b, 3b', 3b".

The user interface 1 is adapted to separately capture user input 5 relative to surface portions 11a, 11b of the faceplate 9. User input 5 separately captured for different surface portions 11a, 11b can be used to derive different combined user input 5. For example, if the user 4 touches a first surface portion and performs a specific touch user input 5 the combined user input 5 can be different than if the user 4 would touch a second surface portion and performs a specific touch user input 5. Touch user input 5 and/or gestures on or across the faceplate 9 may function independently or in combination. The touch sensitivity of the faceplate 9 can be combined with multimodal sensors, e.g., head and/or eye tracking which can be camera based, finger and/or hand proximity and gesture sending for example by a camera such as based on RGB, IR, TOF imaging or LIDAR. Such interactions may include gestures based on touch, mid-air actions and/or mid-air gestures (i.e., gestures that are performed in a distance of 6 to 12 inches from the faceplate 9) and/or a proximity of the hand or finger to the faceplate 9. This can include a tab, slide, drag, long-press, force-touch, multi-touch etc.

The faceplate 9 can be made of glass or a polymer. As indicated schematically in particular in FIG. 2, the faceplate 9 is a solid body without any cavity to ensure an efficient transmission of light. The light that is transmitted from the contact portion 16 of the two-dimensional display 7 to the three-dimensional display surface 11 leaves the faceplate 9 directly at the boundary between the three-dimensional display surface 11 and a surrounding of the faceplate 9, e.g., air, typically the in the cabin 6 of the vehicle 2. I.e., the light that is transmitted from the contact portion 16 is transmitted through only the solid body of the faceplate 9 and has to pass two boundaries only, namely from the contact portion 16 to the contact surface 10 of the faceplate 9 and from the three-dimensional display surface 11 of the faceplate 9 to the surrounding. This reduces the number of boundaries that the light has to pass when travelling from the contact portion 16 to the user. Thereby, optical losses can be held at a low level and high-quality light-transmission is achieved.

Optionally, the light guide material 12 is a composition of many optical fibers (fiber optics elements or similar light guiding material). The light guide material 12 is processed by being drawn and compressed (under heat and pressure) such that the resulting fiber optics elements are on pitch spacing of between 5 and 50 microns or less. Thereby, the faceplate 9 becomes a solid body. The fiber optics elements can be oriented (e.g., as a result of the material processing/formation or the fabrication of the final 3D Faceplate part) to control the viewing angle (i.e., a viewing cone with a central axis longitudinal to an axis of the fiber optics element).

The viewing angle of a 3D faceplate 9 is determined in whole by the viewing angle of the fiber optics elements that make up the faceplate 9. The faceplate 9 can provide a high-quality transmission of light and a viewing cone suited to the view angle of the user 4 to be used with a high-resolution two-dimensional display 7, e.g., a two-dimensional display 7 with $4k$ to $8k$ resolution and/or a pixel density of 600 pixels per inch or more. However, a pixel density of 150 pixels per inch or 200 pixels per inch is also possible and provides an adequate resolution.

The fiber optics elements are arranged so that each of the fiber optics elements is curved between the contact surface 10 and the three-dimensional display surface 11. At the contact surface 10, the fiber optics elements are perpendicular to the contact surface 10. At the three-dimensional display surface 11, the fiber optics elements are perpendicular to the three-dimensional display surface 11. The fiber optics elements enable an efficient and coordinated transmission of light and avoid unwanted visual artifacts, e.g., a visible border, gap, glue junction, and lead to a more seamless and/or borderless appearance. The light guide material 12 of the faceplate 9 comprises portions with differently oriented fiber optics elements. Any section of the three-dimensional display surface 11 is reached by one of the fiber optics elements. Thus, the fiber optics elements are arranged to conceal an assembly structure so that the assembly structure is not visibly perceivable by a user 4. Thus, this effectively conceals the inactive area and/or an assembly structure such as a hardware component to retain the faceplate 9 onto the two-dimensional display 7 and/or magnets.

The faceplate 9 is in the form of a rotatable and movable knob that is touch sensitive, rotatable and translationally movable. The faceplate 9 is rotatable around a rotational axis R as indicated by the dash-dotted line. The rotational axis R is parallel to a normal vector of the two-dimensional display 7 and/or of the contact surface 10 being optionally parallel to the two-dimensional display 7. Thus, the rotational axis R is locally perpendicular to the two-dimensional display 7. Optionally, the rotational axis R is a symmetry axis of the faceplate 9 to improve the user interaction and appearance of the faceplate 9. Optionally, an interface material or fluid is arranged between the contact surface 10 and two-dimensional display 7, e.g., an optical oil that has an optical index that matches the optical index of the faceplate 9 or is between an outer surface material of the two-dimensional display 7 and the optical index of the faceplate material.

The user interface 1 senses the articulation, i.e., the motion of the faceplate 9 as being a user input 5, of the faceplate 9, e.g., movement, sliding, rotation, removal, placement, etc. The motion of the faceplate 9 is sensable using capacitive sensing, force sensing and/or camera-based sensors.

The GUI appearing on the faceplate 9 and appearing around the faceplate 9 on the two-dimensional display 7 is adapted to respond to touch input and/or gestures and to the rotation of the faceplate 9. The user interface 1 is adapted to display information 3*b*, 3*b'*, 3*b''* in dependence on the motion of the faceplate 9.

Additionally force sensing of the faceplate 9, e.g., derived from sensing, via the two-dimensional display 7, the force on the axis of rotation R of force applied to the faceplate 9, may allow the system to register additional inputs such as side-to-side push or pull, front/back push or pull, push down or pull up, etc., for different interactions such as navigation of maps, media content, mirror adjustment, user settings. For example, pushing or pulling on the faceplate 9 is sensed to provide an adjustment the value of a function, e.g., pushing or pulling could adjust the zoom in/out of a map view.

Optionally, the user interface 1 comprises a frame surrounding the faceplate 9. The frame is adapted and arranged to constrain the articulation of the faceplate 9 or provide an input to a sensor, e.g., capacitive touch sensor, camera vision. In another embodiment, the two-dimensional display 7 comprises an aperture or hole that enables a mechanical feature to connect with the faceplate 9, to be mounted or constrain the articulation, or allow sensing of the articulation of the faceplate 9.

Figures 3, 4:
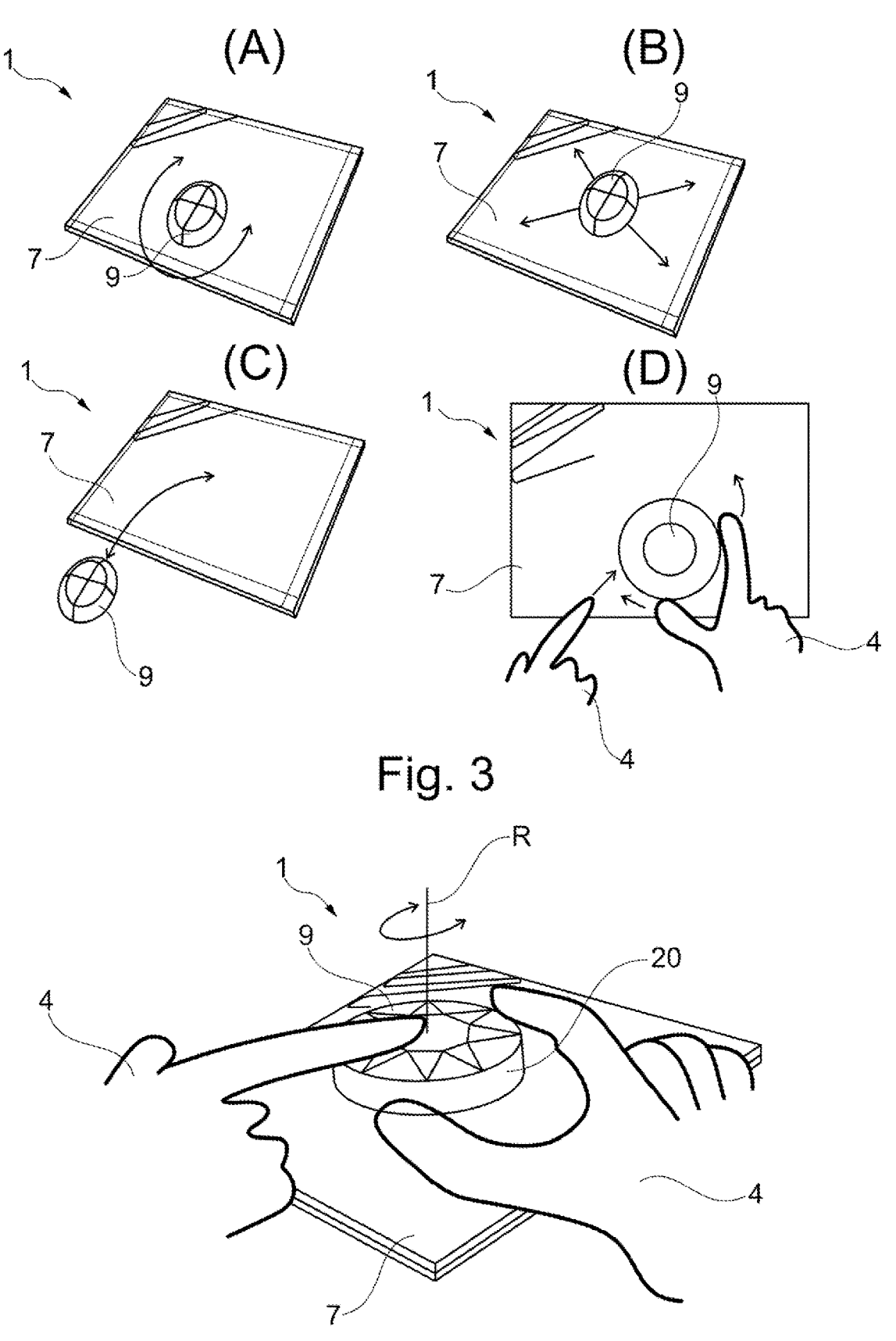
FIG. 3 shows a schematic of a method for operating the user interface shown in FIGS. 1 and 2.
FIG. 4 shows a perspective schematic of a user interface according to an embodiment of the invention.

FIG. 3 shows a schematic of a method for operating the user interface 1 shown in FIGS. 1 and 2. FIG. 3 is described with reference to FIGS. 1 and 2.

In FIG. 3 (A), the faceplate 9 is movably arranged on the two-dimensional display 7. Therein, the faceplate 9 is rotated as indicated by the curved double-arrow. The rotation of the faceplate 9 is sensed by the user interface 1 as user input 5.

In FIG. 3 (B), the faceplate 9 is movably arranged on the two-dimensional display 7. Therein, the faceplate 9 is translationally moved as indicated by the curved double-arrows. The translational motion of the faceplate 9 is sensed by the user interface 1 as user input 5.

In FIG. 3 (C), the faceplate 9 is arranged off the two-dimensional display 7 and is arrangeable on the two-dimensional display 7. Therein, the faceplate 9 is arrangeable on the two-dimensional display 7 as indicated by the curved double-arrow. The arrangement and/or positioning of the faceplate 9 on the two-dimensional display 7 is sensed by the user interface 1 as user input 5. Conversely, removal of the faceplate 9 from the two-dimensional display 7 is sensed by the user interface 1 as user input 5.

In FIG. 3 (D), the faceplate 9 is movably arranged on the two-dimensional display 7. Therein, user input 5 is sensed as touch input performed by the user 4 on the two-dimensional display 7. In addition, the faceplate 9 is rotated as indicated by the two arrows at the right hand of the user 4 articulating the faceplate 9. The rotation of the faceplate 9 is sensed by the user interface 1 as user input 5. The user interface 1 is adapted to derive a combined user input 5 from input to the three-dimensional display surface 11 and/or the two-dimensional display 7 and from the motion of the faceplate 9. The GUI displayed on the two-dimensional display 7 and/or faceplate 9 responds to the user input 5 by the articulation of the faceplate 9 and/or to multi-touch input to the faceplate and/or surrounding two-dimensional display 7. E.g. a user 4 may touch and rotate the faceplate 9 and the user interface 1 responds to both the touch and rotation events, e.g. change color, graphics, motion graphics when touched and modify a feature/function such as audio volume, when the faceplate 9 is rotated. Separate events may be registered by the user interface 1 when the faceplate 9 is touched or articulated by the user 4 as different user input 5. The user interface 1 may display information 3*a*, 3*a'*, 3*b*, 3*b'*, 3*b''* according to those events. For example, the user 4 touches a surface of the faceplate 9 corresponding to a function or "button", then moves or rotates the faceplate 9 as a user input 5 to manipulate the value of the function that was selected when touched.

FIG. 4 shows a perspective schematic of a user interface 1 according to an embodiment. The user interface 1 is described with reference to the user interface 1 as described with reference to FIGS. 1 and 2.

Touch sensing and/or camera sensing allows the user 4 to provide touch and articulation input 5 to the user interface 1. For example, the faceplate 9 is a device that acts as an input device and rotary knob. The faceplate 9 comprises a circular cross-section with a cylindrical side, i.e., a lateral surface 20, projecting to a height of 10-12 mm above the two-dimensional display 7. The top surface of the faceplate 9 may have a 3-dimensional surface 11, faceted surface or any surface form or shape. All surfaces 11, 11*a*, 11*b*, 20 of the faceplate 9 are touch sensitive and the system senses the rotation, i.e., the articulation, of the faceplate 9 by the user 4. In this example, rotation of the faceplate 9 would allow the adjustment of modes, features and functions such as climate control temperature. The user 4 could tap, swipe or apply gestures providing an input based on the GUI state, i.e., on the information 3*a*, 3*a'*, 3*b*, 3*b'*, 3*b''* displayed by the user interface 1. The GUI would provide real-time motion graphics feedback on the user input 4 via the faceplate 9 surfaces and/or two-dimensional display 7 area surround the faceplate 9.

LIST OF REFERENCE SIGNS 1 user interface
2 vehicle
3*a*, 3*a'*, 3*b*, 3*b'*, 3*b''* information
4 user
5 user input
6 cabin
7, 7' two-dimension display
8 display portion
9 faceplate
10 contact surface
11 three-dimensional display surface
11*a*, 11*b* surface portion
12 light guide material
13 data processing device
16 contact portion
17 edge
18 touch sensitive device
19 sensing section
20 lateral surface

The invention claimed is:

1. A user interface for a vehicle adapted to present visible information and adapted to capture user input, the user interface comprising:

an optical faceplate comprising a flat contact surface, a three-dimensional display surface for displaying information, and an optic light guide material provided between the contact surface and the three-dimensional display surface;

a two-dimensional display, the two-dimensional display and the contact surface configured such that light emitted from the two-dimensional display is receivable by the contact surface; wherein the optical faceplate is movably arrangeable at the two-dimensional display;

the user interface is adapted to sense a motion of the optical faceplate on the two-dimensional display as user input;

the user interface is adapted to sense a rotational motion of the optical faceplate and a translational relative motion between the optical faceplate and the two-dimensional display, wherein the rotational motion is defined by a rotation of the optical faceplate around a rotational axis perpendicular to the contact surface and/or the two-dimensional display; and wherein the three-dimensional display surface includes a first display surface portion and a second display surface portion separated by at least one edge, wherein the first display surface portion and the second display surface portion lie in different planes.

2. The user interface as claimed in claim 1, wherein the user interface is adapted to sense a presence and/or absence of the optical faceplate on the two-dimensional display.

3. The user interface as claimed in claim 2, wherein:

an areal extension of the three-dimensional display surface and/or an areal extension of the contact surface is smaller than an areal extension of the two-dimensional display.

4. The user interface as claimed in claim 3, wherein the user interface is adapted to display information in dependence on the motion of the optical faceplate.

5. The user interface as claimed in claim 2, wherein the user interface is adapted to display information in dependence on the motion of the optical faceplate.

6. The user interface as claimed in claim 1, wherein:

an areal extension of the three-dimensional display surface and/or an areal extension of the contact surface is smaller than an areal extension of the two-dimensional display;

wherein the two-dimensional display comprises a plurality of sensing sections; and the user interface is adapted to sense the motion of the optical faceplate at the sensing sections.

7. The user interface as claimed in claim 1, wherein the user interface comprises a plurality of two-dimensional displays, wherein each two of the two-dimensional displays are separated from each other.

8. The user interface as claimed in claim 7, wherein the user interface is adapted to distinguish a motion of the optical faceplate on a first two-dimensional display from a motion of the optical faceplate on a second two-dimensional display.

9. The user interface as claimed in claim 8, wherein the user interface is adapted to derive a user input in dependence on whether a motion of the optical faceplate on the first two-dimensional display is sensed or a motion of the optical faceplate on the second two-dimensional display is sensed.

10. The user interface as claimed in claim 9, wherein the user interface is adapted to display information in dependence on the motion of the optical faceplate.

11. The user interface as claimed in claim 10, wherein the three-dimensional display surface is touch-sensitive.

12. The user interface as claimed in claim 1, wherein the user interface is adapted to display information in dependence on the motion of the optical faceplate.

13. The user interface as claimed in claim 12, wherein the three-dimensional display surface is touch-sensitive.

14. The user interface as claimed in claim 13, wherein the user interface is adapted to derive a combined user input from input to the three-dimensional display surface and/or the two-dimensional display and from the motion of the optical faceplate.

15. The user interface as claimed in claim 1, wherein the three-dimensional display surface is touch-sensitive.

16. The user interface as claimed in claim 15, wherein the user interface is adapted to derive a combined user input from input to the three-dimensional display surface and/or the two-dimensional display and from the motion of the optical faceplate.

17. A vehicle comprising the user interface as claimed in claim 1.

*     *     *     *     *